March 24, 1925. 1,530,590
C. W. BECK
STEERING WHEEL AND METHOD OF FORMING THE SAME
Filed Sept. 20, 1922 2 Sheets-Sheet 1
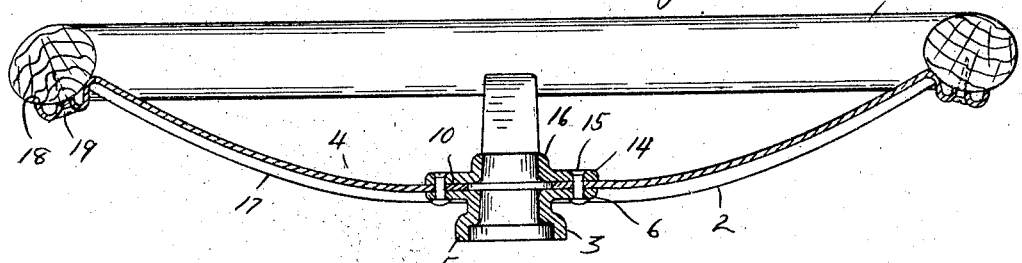
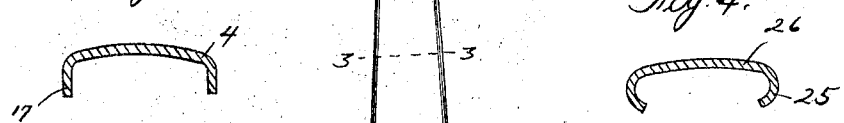
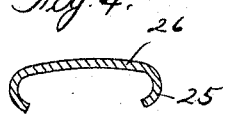
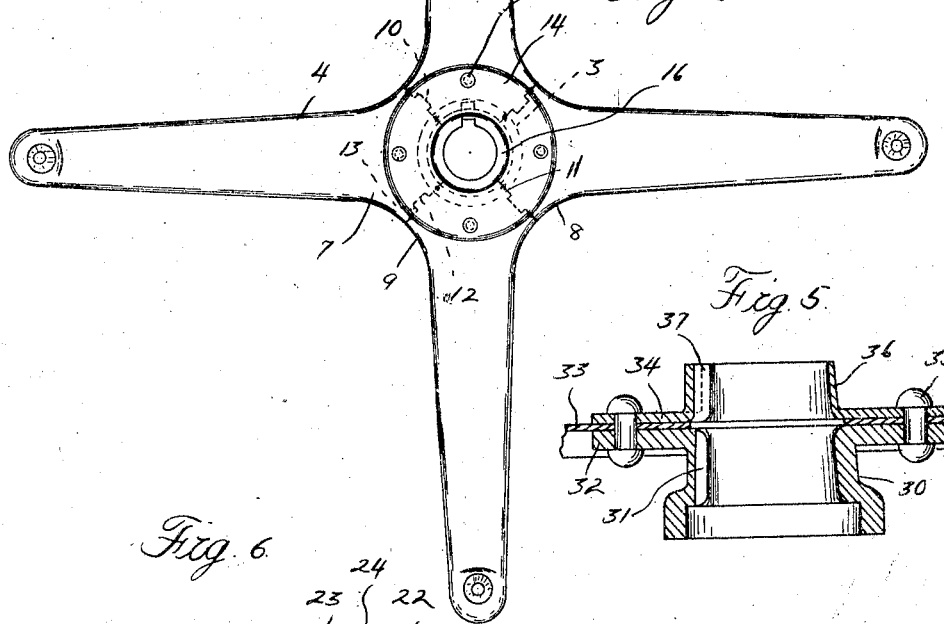
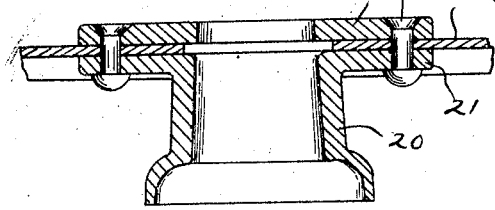
Inventor
Charles W. Beck
By
Attorney March 24, 1925.
C. W. BECK
1,530,590
STEERING WHEEL AND METHOD OF FORMING THE SAME
Filed Sept. 20, 1922    2 Sheets-Sheet 2
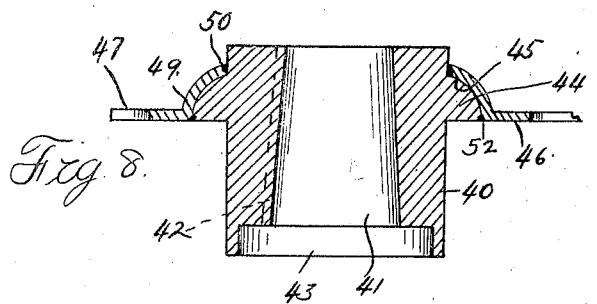
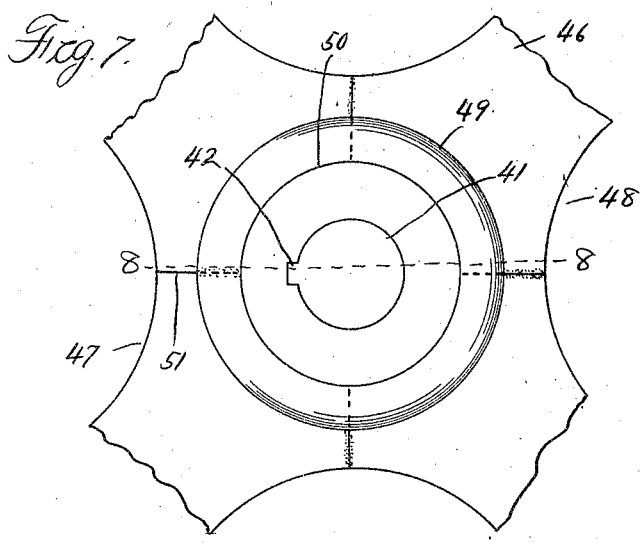
Inventor
Charles W. Beck Patented Mar. 24, 1925.

1,530,590

UNITED STATES PATENT OFFICE.

CHARLES W. BECK, OF DETROIT, MICHIGAN, ASSIGNOR TO THE BECK-FROST CORPORATION, OF DETROIT, MICHIGAN, A CORPORATION OF MICHIGAN.

STEERING WHEEL AND METHOD OF FORMING THE SAME.

Application filed September 20, 1922. Serial No. 589,475.

*To all whom it may concern:*

Be it known that I, CHARLES W. BECK, a citizen of the United States of America, residing at Detroit, in the county of Wayne and State of Michigan, have invented certain new and useful Improvements in Steering Wheels and Methods of Forming the Same, of which the following is a specification, reference being had therein to the accompanying drawings.

This invention relates to steering wheels for automobiles, boats and the like and particularly to wheels wherein the spider or metal part is of the built-up and assembled type.

An object of the invention is to provide a strong and durable wheel which is simple in construction and which may be manufactured at a very low cost.

Another object is to provide a light and efficient wheel in which the spider is formed separately from the rim and is composed of a plurality of parts which may be easily and quickly assembled and readily attached to the rim.

Another object is to provide a steering wheel in which the spider is made of stampings which are machined or cast in part and are fastened together by either riveting or casting.

With the above and other objects in view the invention consists in certain novel features of construction, combination and arrangement of parts, as will be more fully described and particularly pointed out in the appended claims.

In the accompanying drawings:

Figure 1 is a sectional view through a steering wheel embodying my invention;

Figure 2 is a top plan view of the spider;

Figure 3 is a detail sectional view taken on line 3—3 of Figure 2;

Figure 4 is a detail sectional view through a slightly modified form of arm;

Figure 5 is a detail sectional view showing a slightly modified form of hub;

Figure 6 is a detail sectional view showing another slightly modified form of hub;

Figure 7 is a fragmentary top plan view of a slightly modified form of spider;

Figure 8 is a detail sectional view taken on line 8—8 of Figure 7.

The general plan of the invention consists in making a spider which is composed of two or more members which form the arms of the spider, a top member or plate and a bottom member or hub piece, all of which being rigidly and permanently fastened together to comprise an integral construction.

Referring now to the drawings in which like characters of reference designate corresponding parts throughout the several views, the numeral 1 designates the rim, preferably of wood, supported upon a metallic spider 2 which includes a relatively short hub 3 and a plurality of radially extending tapering arms 4. The hub may be constructed in any desired way and of any suitable material, but is preferably a steel stamping. The arms may also be constructed of any suitable material but are preferably formed of sheet metal.

The hub is adapted to receive a revoluble steering stem (not shown) and is provided with an enlarged offset portion 5 at one end for engagement with a stationary steering column (not shown). The hub is also provided at the opposite end with an annular flange 6 which supports the arms. The inner ends of the arms are flared as shown at 7, providing heads 8 which project beyond the edges of the flange 6. The heads 8 are curved as shown at 9 and cooperate with each other to form an annulus 10 which is adapted to surround the revoluble steering stem. The contacting edges 11 of the heads are located in planes which are disposed at right angles to each other and are provided with interlocking tongues 12 and grooves 13. The heads are also spot welded together at the opposite ends of the tongues to retain the arms in position.

An annular plate 14, preferably a metal stamping is arranged upon the heads 8 and is secured to the flange 6 by means of rivets 15 which extend through the heads. An upstanding annular flange 16 is formed integral with the plate 14 and is adapted to receive the revoluble steering stem. The arms curve upwardly from the hub and are provided with parallel depending flanges 17 at their opposite edges. The arms have downwardly inclined portions at their outer ends which provide seats 18 for the rim and are secured thereto by means of screws 19.

In the process of construction the tongues 12 are placed in engagement with the grooves 13 and the heads 8 are spot welded together at the opposite ends of the tongues. Following the spot welding operation, the heads 8 are positioned upon the flange 6. The plate 14 is then placed upon the heads and is riveted to the flange 6 to secure the arms in position. After the riveting operation, the rim 1 is secured to the seats 18 and a finished wheel is produced.

In the modification illustrated in Figure 6 a relatively long hub 20 is employed in the construction of the spider. An annular flange 21 is formed integral with the hub 20 at the upper end thereof and supports a plurality of arms 22 which are constructed and assembled similar to the arms 4. An annular plate 23 is arranged upon the inner ends of the arms and is secured to the flange 21 by means of rivets 24 which extend through the arms 22.

In the modification illustrated in Figure 4 inwardly curved depending flanges 25 are formed at the opposite edges of each arm 26.

In the modification illustrated in Figure 5 a relatively short hub 30 of any suitable material, having a longitudinal keyway or slot 31 formed therein is employed in the construction of the spider. An annular flange 32 is formed integral with the hub 30 at the upper end thereof and supports a plurality of arms 33 which are constructed and assembled similar to the arms 4. An annular plate 34 of any suitable material, is arranged upon the inner ends of the arms 33 and is secured to the flange 32 by means of rivets 35 which extend through the arms 33. An upstanding annular flange 36 is formed integral with the plate 34 and is provided with a pair of longitudinally extending parallel lugs 37 which are in alignment with the keyway or slot 31 in the hub 30. The slot 31 and the lugs 37 are adapted to receive a key (not shown) upon the revoluble steering stem.

In Figures 7 and 8, I have shown a construction in which there are four separate arms which are held to one integral hub piece to form the spider. In detail, a relatively long hub 40, preferably machined from bar stock, is employed in the construction of the spider. This hub has a tapering bore 41 to receive the revoluble steering stem (not shown) and is provided with a longitudinal keyway 42 to receive the key of the steering stem. The hub 40 is also provided with an annular recess 43 at its lower end which is adapted to receive a stationary steering column (not shown). An annular flange 44 is formed integral with the hub 40 adjacent to the upper end thereof and is provided with a curved upper surface 45 which supports a plurality of arms 46. The inner ends of the arms 46 are flared as shown at 47 providing heads 48. These heads are curved upwardly as shown at 49 and inwardly as shown at 50 to fit the curved surface 45 of the flange 44 and the outer walls of the hub respectively. The contacting edges 51 of the heads 48 are straight and are located in planes which are disposed at right angles to each other. The heads 48 are welded to each other along the contacting edges 51 and are also welded to the hub as shown at 50 and 52. In the process of construction the heads 48 are secured to each other by welding along the contacting edges 51. The assembled heads are then placed upon the hub 40 and are finally welded to the flange 44. Without departing from the invention, the four arms may be made of one or two separate parts which may be welded to the hub piece to form an integral spider.

What I claim as my invention is:

1. A steering wheel comprising a hub provided with a longitudinal keyway, said hub also having an enlarged portion at one end, an annular flange formed on said hub at the opposite end, a plurality of radially extending arms engaging said flange, a rim carried by said arms, an annular member engaging said arms, an annular upstanding flange formed upon said annular member and disposed in alignment with said hub, and means engaging the first mentioned flange and said member securing said arms thereto.

2. A steering wheel comprising a hub, a plurality of arms arranged in contacting relation on said hub, said arms being welded to each other at their contacting edges, the contacting edges of said arms having interlocking tongues and grooves, a rim connected to said arms, and means securing said arms to said hub.

3. A steering wheel comprising a hub having a flange, a plurality of radially extending arms arranged in contacting relation upon said flange, the contacting edges of each arm being located in planes disposed at right angles to each other, said arms being welded together along their contacting edges, a rim carried by said arms, and means for securing said arms to said flange.

4. In a wheel, a hub having an annular flange, radially extending arms mounted on said flange, said arms having depending flanges cooperating with each other for receiving said annular flange.

5. A steering wheel comprising a hub having an annular flange, a plurality of radially extending arms having flared portions mounted on said flange, flanges extending downwardly from the flared portions of said arms and disposed adjacent to the outer edges of said annular flange, a rim carried by said arms, and means for permanently securing the flared portions of said arms to the annular flange of said hub.

6. In a steering wheel, a hub having a flange at one end, a plurality of radially extending arms having flared portions engaging said flange, said flared portions being welded together and forming an integrated spider, and means for securing said spider to said flange.

In testimony whereof I affix my signature.

CHARLES W. BECK.